United States Patent
Allmendinger et al.

(10) Patent No.: US 9,838,229 B2
(45) Date of Patent: Dec. 5, 2017

(54) METHOD FOR VERIFYING THE FUNCTIONALITY OF A DIGITAL CIRCUIT

(71) Applicant: International Business Machines Corporation, Armonk, NY (US)

(72) Inventors: Dirk Allmendinger, Nuertingen (DE); Sven Boekholt, Dettenhausen (DE); Paul A. Ganfield, Rochester, MN (US); Roopesh A. Matayambath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 14/678,992

(22) Filed: Apr. 5, 2015

(65) Prior Publication Data
US 2015/0288548 A1 Oct. 8, 2015

(30) Foreign Application Priority Data

Apr. 8, 2014 (GB) .................................. 1406264.0

(51) Int. Cl.
| H04L 1/00 | (2006.01) |
| H04L 25/14 | (2006.01) |
| H04L 12/26 | (2006.01) |

(52) U.S. Cl.
CPC .......... *H04L 25/14* (2013.01); *H04L 43/0817* (2013.01); *H04L 43/50* (2013.01)

(58) Field of Classification Search
CPC ...... H04L 25/14; H04L 43/0817; H04L 43/50
See application file for complete search history.

(56) References Cited

U.S. PATENT DOCUMENTS

| 5,923,869 A * | 7/1999 | Kashiwagi | G11B 20/10 348/E5.011 |
| 8,161,210 B1 * | 4/2012 | Norrie | H04L 25/14 710/33 |
| 9,036,764 B1 * | 5/2015 | Hossain | H03L 7/087 375/355 |
| 2001/0053281 A1 * | 12/2001 | Kashiwagi | G11B 20/10 386/201 |
| 2006/0156083 A1 * | 7/2006 | Jang | G06F 13/423 714/700 |
| 2007/0177701 A1 * | 8/2007 | Thanigasalam | H04J 3/062 375/372 |
| 2011/0109936 A1 * | 5/2011 | Coffee | H04N 1/00214 358/1.15 |

* cited by examiner

*Primary Examiner* — Abdelnabi O Musa
(74) *Attorney, Agent, or Firm* — Lieberman & Brandsdorfer, LLC (57) ABSTRACT

A method, data processing system, and computer program product for verifying the functionality of a digital circuit. The method includes transmitting sequences of parallel data packets via parallel data transfer paths. Prior to receipt of at least two of the transmitted sequences, a first skew is introduced between the at least two of the transmitted sequences. This introduction includes inserting one or more parallel control data packets in the transmitted sequences, and erasing one of the control data packets, replacing one of the control data packets, and inserting another control data packet in one of the sequences. The method includes determining if an expected indicator signal is provided in the form of an overflow indicator or an underflow indicator.

17 Claims, 7 Drawing Sheets

METHOD FOR VERIFYING THE FUNCTIONALITY OF A DIGITAL CIRCUIT

CROSS-REFERENCE TO RELATED APPLICATION(S)

This application claims priority under 35 U.S.C. §119 from British Patent Application No. GB 1406264.0, filed on Apr. 8, 2014, the entire contents of which are incorporated by reference herein.

BACKGROUND

Technical Field

The present application relates to circuits. More specifically, the present application relates to a method for verifying the functionality of a digital circuit.

Description of the Prior Art

In clocked systems, skew might occur when sequences of parallel data packets transmitted along parallel data transfer paths lose time reference due to different data transfer path lengths and data transfer path impedances of the data transfer paths. These systems may not function properly if the skew is not corrected by deskew circuits (i.e., circuits dedicated to the deskewing of signals transmitted along parallel data transfer paths). Typically, a deskew circuit of the sender simultaneously inserts identical control data packets in data sequences transmitted along all the parallel data transfer paths, and a deskew circuit of the receiver buffers the transmitted data sequence and erases some or all of the control data packets inserted by the deskew circuit of the sender so that the data following directly the inserted control data packets is forwarded by the deskew circuit of the receiver roughly at the same time for all data transfer paths. Exemplary systems comprising deskew circuits are disclosed in WO 2013/176954, US 2013/0283085, U.S. Pat. No. 8,526,554, US 2011/0243211, U.S. Pat. No. 7,979,608, U.S. Pat. No. 7,197,100, U.S. Pat. No. 7,500,131, and US 2012/0030438, wherein some of these systems specifically refer to the widely spread PCIe networks. In PCIe networks, the parallel data transfer paths consist of lanes composed of two differential signaling pairs. One pair is for receiving data and the other pair is for sending data.

In general, the verification of the proper operation of the deskew circuits is as critical as the verification of the further operation of the systems comprising the deskew circuits. However, the deskew circuits perform the deskew mechanisms to be verified only if there is actually skew. In contrast to other simulations, it is not sufficient to apply different test vectors (sets of input signals applied during the simulation) as the skew is an inherent feature of the data transfer paths. Currently, delay elements are inserted in the simulated circuits in order to verify different skew scenarios in simulations, wherein different delay elements are required for each skew scenario so that the verification of the deskew circuits is very time-consuming.

SUMMARY

The aspects described herein comprise a method, a data processing system, and a computer program product for verifying the functionality of a digital circuit.

According to one aspect, a method for verifying the functionality of a digital circuit with parallel data paths is provided. The method comprises transmitting sequences of parallel data packets via the parallel data paths. Prior to receipt of at least two of the transmitted sequences, a first skew is introduced between the at least two of the transmitted sequences. Introduction includes inserting one or more parallel control data packets in the transmitted sequences and erasing one of the control data packets, replacing one of the control data packets, or inserting another control data packet in one of the transmitted sequences. It is determined if an expected indication signal is provided. The indicator signal is an overflow indicator or an underflow indicator. The verification can be performed for a design of a digital circuit or a real digital circuit.

According to another aspect, a data processing system is provided for performing verification of the functionality of a digital circuit with parallel data paths. A sender transmits sequences of parallel data packets via the paths. Prior to receipt of at least two of the transmitted sequences, one or more devices introduce a first skew between the transmitted sequences. The introduction includes inserting one or more parallel control data packets in the transmitted sequences, and selecting erasing one of the inserted control packets, replacing one of the control packets, or inserting another control packet in one of the sequences. A a receiver receives the transmitted packets and determines if an expected indicator signal is provided. The indicator signal is an overflow indicator or an underflow indicator. A data processing system suitable for storing and/or executing program code will include at least one processor coupled directly or indirectly to memory elements through a system bus.

According to yet another aspect, a computer program product for verifying the functionality of a digital circuit is provided. The computer program product includes a computer-readable storage medium having computer readable program code embodied thereon, which when executed causes a computer to implement a method for transmitting sequences of parallel data packets via the parallel data paths. Prior to receipt of at least two of the transmitted sequences, a first skew is introduced between at least two of the transmitted sequences. This introduction includes inserting one or more parallel control data packets in the transmitted sequences and erasing one of the control data packets, replacing one of the control data packets, or inserting another control data packet in one of the transmitted sequences. It is determined if an expected indication signal is provided. The indicator signal is an overflow indicator or an underflow indicator. The verification can be performed for a design of a digital circuit or a real digital circuit.

BRIEF DESCRIPTION OF THE DRAWINGS

The drawings referenced herein form a part of the specification. Features shown in the drawings are meant as illustrative of only some embodiments, and not of all embodiments unless otherwise explicitly indicated. Implications to the contrary are otherwise not to be made.

DETAILED DESCRIPTION

It will be readily understood that the components, as generally described and illustrated in the Figures herein, may be arranged and designed in a wide variety of different configurations. Thus, the following detailed description of the embodiments of the apparatus, system, and method, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of sensors, detectors, etc., to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the following description of the embodiments, reference is made to the accompanying drawings that form a part hereof, and which shows by way of illustration the specific embodiment in which the embodiment may be practiced. It is to be understood that other embodiments may be utilized because structural changes may be made without departing from the scope of the present embodiment(s).

Figure 1:
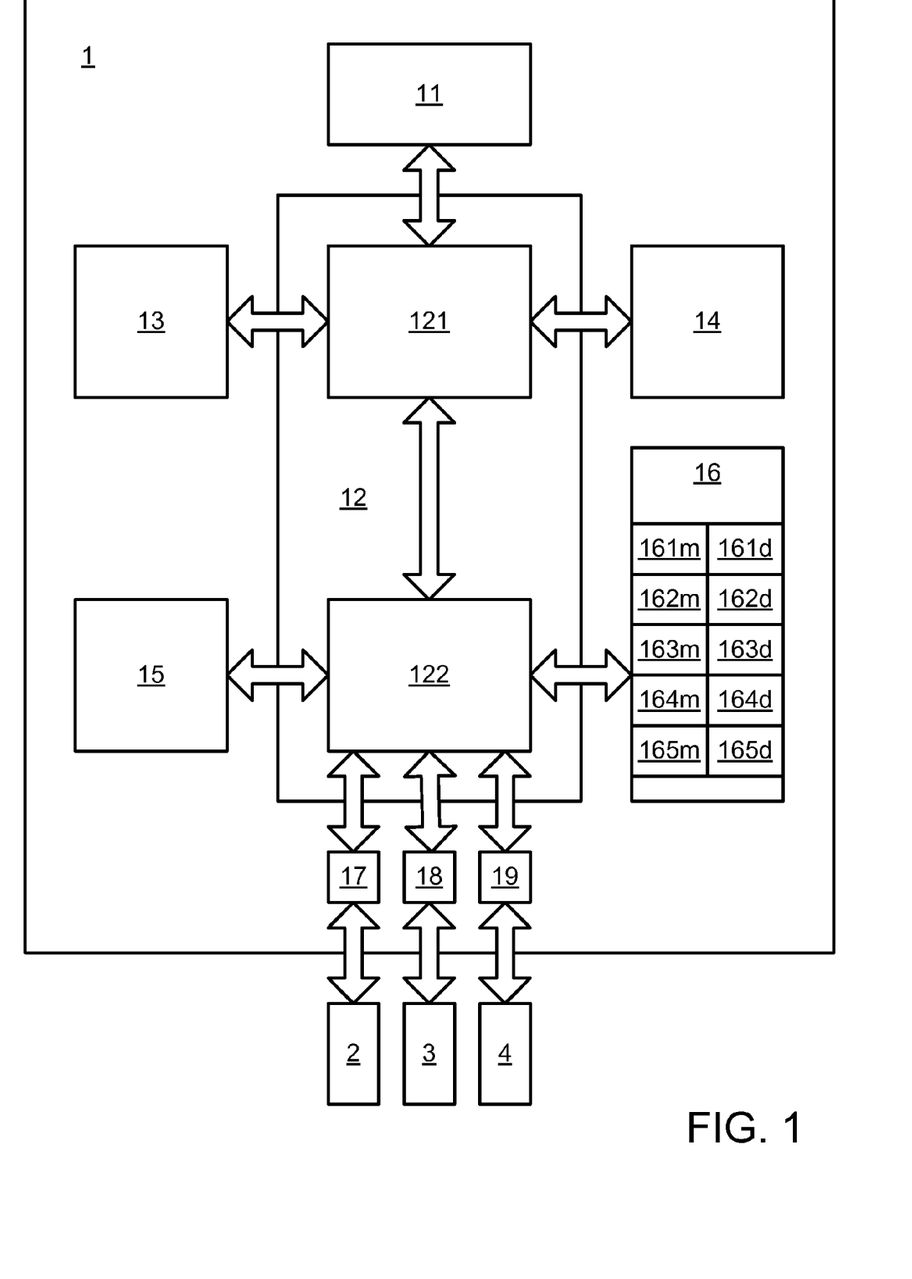
FIG. 1 shows the architecture of a computer system.

FIG. 1 shows the architecture of a computer system including a computer (1), two input devices (2) and (3), and an output device (4). The computer (1) comprises a CPU (11), a chipset (12), a PCIe network (13), a volatile memory (RAM) (14), a PCI bus (15), a non-volatile memory (16), and interface devices (17), (18), and (19). The input device (2) is a mouse, the input device (3) is a keyboard, and the output device (4) is a monitor. The chipset (12) comprises a northbridge device (121) and a southbridge device (122). The northbridge device (121) communicates with (sends data to and receives data from) the CPU (11), the PCIe network (13), the volatile memory (RAM) (14), and the southbridge device (122). The southbridge device (122) communicates with the PCI bus (15), the non-volatile memory (ROM) (16), and the interface devices (17), (18), and (19). The interface devices (17), (18), and (19) communicate with the input device (2), the input device (3), and the output device (4), respectively. In the non-volatile memory (16), system software (not shown), middleware (not shown), application software (161m), (162m), (163m), (164m), and (165m), and application data (161d), (162d), (163d), (164d), and (165d) are stored. The volatile memory (14) is used for the execution of the system software, middleware, and application software. The basic computer architecture, the functioning and interaction of the computer system components (computer (1), input devices (2) and (3), output device (4), the CPU (11), the chipset (12), the PCIe network (13), the volatile memory (14), the PCI bus (15), the non-volatile memory (16), and interface devices (17), (18), and (19)), the system software, the middleware, application software (161m), (162m), (163m), (164m), and (165m), and application data (161d), (162d), (163d), (164d), and (165d) are known from the prior art and are therefore not described in detail.

The application software comprises a circuit design module (161m), a circuit simulation module (162m), a trace module (163m), a reference module (164m), and a debug module (165m). The circuit design module (161m), the circuit simulation module (162m), the trace module (163m), the reference module (164m), and the debug module (165m) may have to be compiled or may already have been compiled in order to generate respective executable programs. The application data comprise circuit design data (161d), circuit simulation data (162d), reference data (163d), debug data (164d), and trace data (165d), wherein circuit design data (161d) are data generated by the circuit design module (161m), circuit simulation data (162d) are data generated by the circuit simulation module (162m), reference data (163d) are data generated by the reference module (163m), debug data (164d) are data generated by the debug module (164m), and trace data (165d) are data generated by the trace module (165m).

The circuit design module (161m) enables the description of a digital circuit (e.g., a processor) using a hardware description language (HDL), preferably a register transfer level (RTL) description language (HDL, e.g., VERILOG or VHDL). The design of the digital circuit is composed of at least one entity. The entity can be hierarchically ordered. An entity of a higher hierarchy can comprise several entities of a lower entity. Each entity is defined by an entity name, entity ports, and a function performed by the entity and typically comprises a number of interconnections connecting the entity ports to ports outside the entity. The ports are either input ports, output ports or bidirectional ports. The ports outside the entity can be input, output or bidirectional ports of further entities or the overall digital circuit. The design of the digital circuit is stored as one or several circuit design data file(s) (161d).

The circuit simulation module (162m) enables the simulation of the electronic behavior of the digital circuit stored as the circuit design data file(s) (161d), the display of the circuit design data on the monitor 4 (see FIG. 1), the generation of a sequence of input vectors (each input vector is a complete set of input signals of the simulated digital circuit at a given time), the application of the input vectors to the ports and/or bidirectional ports of the digital circuit, and the generation of circuit simulation data (162d) as a function of time. The circuit simulation module (162m) stores the circuit simulation data (162d) typically including the input vectors, the output vectors (each output vector is a complete set of output signals of the simulated digital circuit at a given time), and (details of) further signal values and events of interest to the simulated digital circuit as a function of time in one or several simulation data file(s) (162d) (e.g., signal values of interest can be the output or input values of an entity). For example, events of interest can be the complete receipt or forwarding of a data packet by an entity.

The trace module (163m) logs the states (e.g., the digital value of output or input signals) of the digital circuit or further events of interest during the simulation of the digital circuit. The trace module (163m) can comprise code which is inserted in the circuit design data file(s) (161d) and results in the output of trace messages which are stored in one or several trace data file(s) (163d) during the execution of the code during the simulation of the digital circuit. Alternatively, the trace module (163m) may be formed as a separate high-level language (e.g., C or C++) module which can extract signal values or further events of interest during the simulation, generate trace messages, and store them as one or several trace data file(s) (163d). Typically, each trace message comprises a time stamp, local information, and a comment including an optional identifier. The trace message can also contain information derived from extracted signal values or events of interest. For example, an error message is created if a function of sub-function of an entity or code of the design data file is not exercised during the simulation.

The reference module (164m) is a module written in a high-level language like C or C++ or a hardware description language (HDL) like VHDL or VERILOG and enables the generation of expected output signals and/or further signals or events of interest using the input vectors generated by and received from the circuit design module. The reference module 164m stores the expected output signals and (details of) further signal values or events of interest as a function of time in one or several reference data file(s) (164d).

The debug module (165m) enables the comparison of simulation data to the reference data using the input vectors, the output vectors, (details of) further signal values and events of interest produced by and received from the circuit simulation module (162m) and the output vectors, (details of) further signal values and events of interest produced by and received from the reference design simulation module (164m). In this comparison, the signal values generated by the circuit simulation module (162m) are compared to the corresponding signal values generated by the reference module (164m) at a given time and debug messages are created on the basis of this comparison. Typically, each debug message comprises a time stamp, local information, and a comment including an optional identifier. For example, a specific debug message (error message) is generated if there is a discrepancy between the values generated by the circuit simulation module (162m) and the respective values generated by the reference design simulation module (164m). The debug module (165m) stores the debug messages in one or several debug data file(s) (165d).

Similar or identical circuit design modules, circuit simulation modules, trace modules, reference simulation modules, and debug module are known from the state of the art. Special features of the modules (161m), (162m), (163m), (164m), and (165m) are described hereinafter. As far as the modules (161m), (162m), (163m), (164m), and (165m) differ from known modules, a person skilled in the art could realize such modules from the description of the tasks enabled by the modules.

Figure 2:
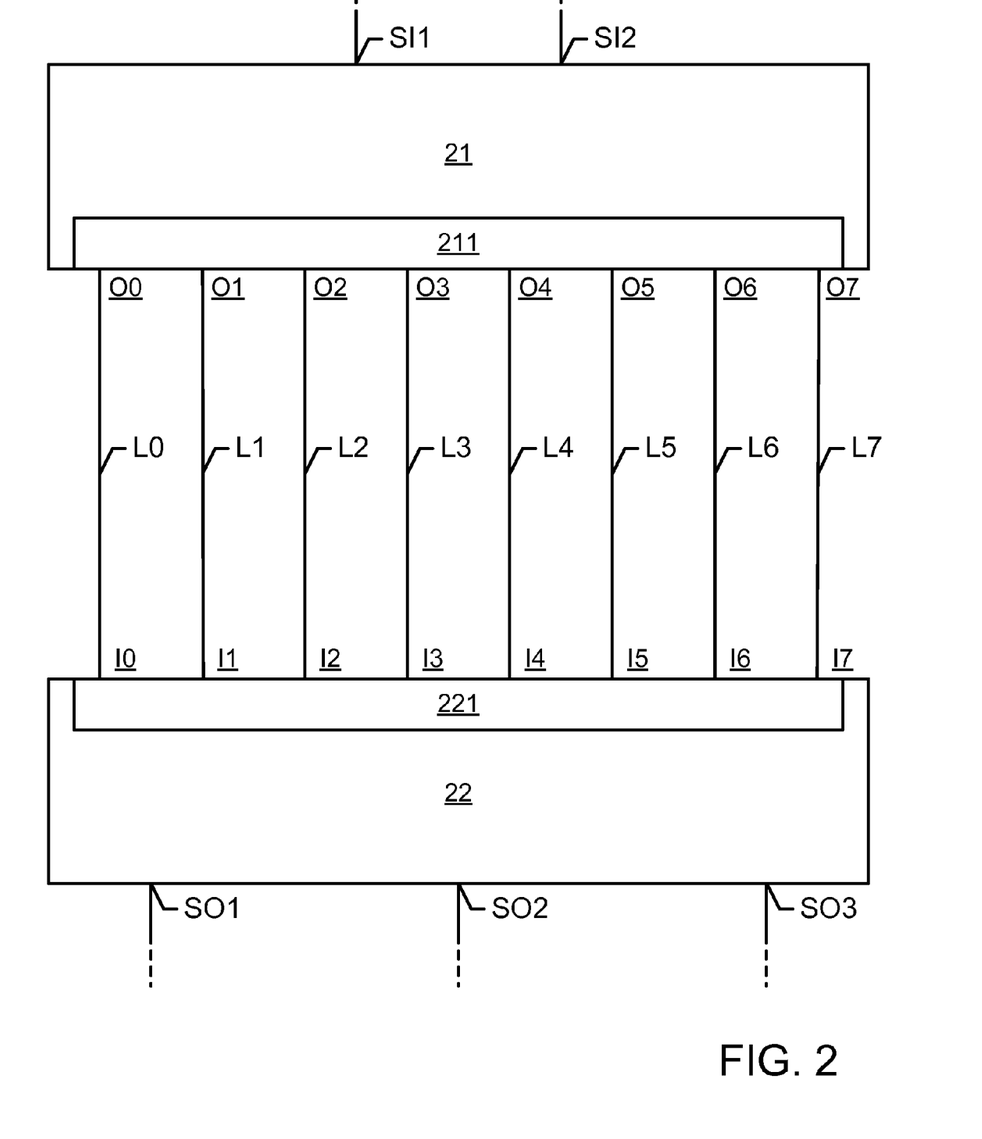
FIG. 2 shows a sender and receiver connected by several lanes.

FIG. 2 shows a sender (21) and a receiver (22) connected by several lanes (L0), (L1), (L2), (L3), (L4), (L5), (L6), and (L7). In this context, the sender is any digital electronic device that can send data to the receiver. In this context, the receiver is any digital electronic device that can receive data from the sender and lanes (L0), (L1), (L2), (L3), (L4), (L5), (L6), and (L7) are parallel data transfer paths. In this context, parallel data transfer paths are communication channels such as copper wires dedicated to the transfer of parallel data. Preferably, the parallel data transfer paths form a duplex point-to-point connection between the sender and the receiver used for the transfer of parallel data. In a preferred embodiment, the parallel data transfer paths form a duplex point-to-point connection between the sender and the receiver used for the transfer of parallel data. This implies that the sender could also act as a receiver and that the receiver could also act as a sender. These two terms are used in order to distinguish both devices in the context of the claims. The sender (21) and the receiver (22) are implemented in a PCIe network. The sender (21) receives input data from the two signal lanes (SI1) and (SI2) and sends parallel output data (symbols) (O0), (O1), (O2), (O3), (O4), (O5), (O6), and (O7) via the lanes (L0), (L1), (L2), (L3), (L4), (L5), (L6), and (L7) to the receiver (22). The receiver (22) receives parallel input data (symbols) (I0), (I1), (I2), (I3), (I4), (I5), (I6), and (I7) (the delayed output data of the sender (21)) via the lanes (L0), (L1), (L2), (L3), (L4), (L5), (L6), and (L7) and outputs output data to the two signal lanes (SO1) and (SO2) and an overflow or underflow indication signal to the signal line (SO3). Preferably, the parallel output data and the parallel input data comprise symbols. Each lane (L0), (L1), (L2), (L3), (L4), (L5), (L6), and (L7) is connected to a port of the sender (21) and a port of the receiver (22), respectively. Lanes are composed of two differential signaling pairs, wherein one pair is for receiving data and the other pair is for sending data. The sender (21) and the receiver (22) comprise a deskew circuit (211) and (221), respectively. The sender deskew circuit and the receiver deskew circuit interact in order to prevent the overflow or the underflow of the receiver. The sender deskew circuit is adapted to insert parallel control data packets in the sequences, and the receiver deskew circuit is adapted to remove at least one of the parallel control data packets.

In a preferred embodiment, each of the control data packets comprises (or is) a control symbol which can be specified in a communication protocol such as a PCIe protocol. Preferably, each of the further control data packets comprises (or is) a control symbol which can be specified in a communication protocol such as a PCIe protocol. In particular, the control symbol or further control symbol(s) might be a SKIP, ACK or NAK symbol as specified in a PCIe protocol. In a further development of the preferred embodiment, the control symbol is a SKIP symbol. Preferably, the parallel control data packets inserted by the sender deskew circuit in each of the sequences form SKIP ordered sets including a COM symbol and one or several SKIP symbols as specified in a PCIe protocol. SKIP ordered sets can be used in PCIe networks for clock compensation and deskewing. Preferably, each of the further control data packets comprises (or is) a SKIP symbol.

The deskew circuit (211) of the sender (21) inserts simultaneously a SKIP ordered set in each of the data sequences transmitted along the lanes (L0), (L1), (L2), (L3), (L4), (L5), (L6), and (L7). The deskew circuit (221) of the receiver (22) may remove some of the SKIP symbols inserted by the deskew circuit of the sender (211) so that the first symbols following directly the inserted symbols are forwarded by the deskew circuit (221) of the receiver (22) roughly at the same time for all lanes. The receiver deskew circuit may also be adapted to remove several parallel control data packets in one or several of the sequences.

A skew is introduced between the sequences by erasing or replacing one of said control data packets or inserting a further control data packet in one of the sequences before the receipt by the receiver, and it is checked whether an expected overflow or underflow indication signal is provided by the receiver or not. Preferably, several further control data packets can be inserted in one or several (at least two) of the sequences before the receipt by the receiver. Preferably, the receiver deskew circuit is adapted to remove at least one of the further control data packets. Preferably, the receiver deskew circuit is adapted to remove the replaced control data packet. When a control data packet is replaced by another control data packet, a control data packet is erased and another control data packet is inserted in the same data sequence. The other inserted control data packet has a higher or lower number of bits than the erased control data packet resulting in skew. In this context, a control data packet is a data packet used in order to achieve control over the other transmitted data which includes payload data. In yet another preferred embodiment, the further control data packet is inserted in one of the sequences, and one of the control data packets is erased in another of the sequences. This can result in a maximum skew which corresponds to the combined lengths of the control data sequence and the further control data sequence.

Figure 3:
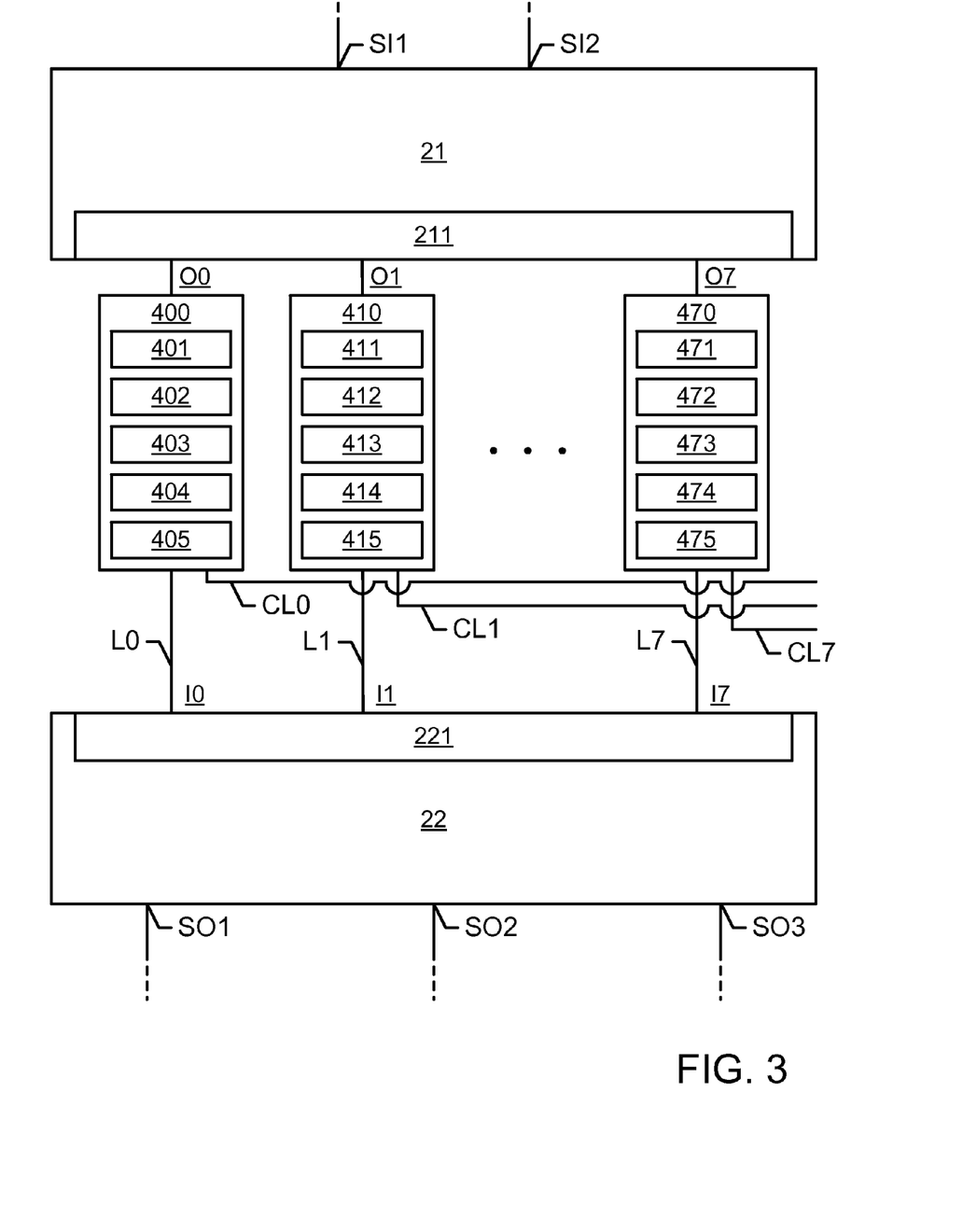
FIG. 3 shows the sender and receiver of FIG. 2 connected by several lanes including auxiliary simulation devices.

In a preferred embodiment, the control data packet is erased or replaced by an auxiliary simulation device in one of the parallel data transfer paths, or the further control data packet is inserted by an auxiliary simulation in one of the parallel data transfer paths. In order to imitate the behavior of data transfer paths introducing skew, the auxiliary simulation device is controlled by applying a control signal resulting in erasing or replacing the control data packet or inserting the further control data packet. FIG. 3 shows the sender and receiver of FIG. 2 connected by several lanes including auxiliary simulation devices (400), (410) . . . and (470). The auxiliary simulation devices (400), (410) . . . and (470) are created by the circuit design module (161$m$) (see FIG. 1) and stored as circuit design data (161$d$) (see FIG. 1), but are not part of the circuit which is simulated. One of the auxiliary simulation devices (400), (410) . . . (470) is inserted in each of the parallel data transfer paths (L0) to (L7). The auxiliary simulation devices (400), (410) . . . (470) are controlled by control signals received via a respective control signal line (CL0), (CL1) . . . or (CL7). Each auxiliary simulation device (400), (410) . . . and (470) comprises a buffer (401), (411) . . . or (471), a symbol analyzer (402), (412) . . . or (472), a controller (403), (413) . . . or (473), a symbol generator (404), (414) . . . or (474), and an output device (405), (415) . . . or (475). The buffers (401), (411) . . . and (471) which are formed as FIFOs or queues store symbols (O0), (O1), (O2), (O3), (O4), (O5), (O6), and (O7) received from the sender (21). The symbol analyzers (402), (412) . . . and (472) determine the types of the symbols stored in the respective buffer (401), (411) . . . or (471). The controllers (403), (413) . . . (473) control the respective symbol generator (404), (414) . . . or (474) and the respective output device (405), (415) . . . or (475) depending on the result(s) of the determination of the respective symbol analyzer (402), (412) . . . or (472) and the control signal received from the respective control signal line (CL0), (CL1) . . . or (CL7). The output devices (405), (415) . . . and (475) output the symbols (I0), (I1), (I2), (I3), (I4), (I5), (I6), and (I7) stored in the respective buffer (401), (411) . . . or (471) and/or generated by the respective symbol generator (404), (414) . . . or (474). The control signals are generated by the circuit simulation module (162$m$) (see FIG. 1). A definition parameter is used in order to indicate that the devices (230), (231) . . . and (237) are auxiliary simulation devices. A person skilled in the art could realize such auxiliary simulation devices (400), (410) . . . or (470) from the description of the tasks performed by them. Therefore, a detailed description is not necessary.

In yet another preferred embodiment, the control data packet is erased or replaced by manipulating simulation data, or the further control data packet is inserted by manipulating simulation data. Preferably, the manipulation is performed by a circuit simulation module. Instead of inserting auxiliary simulation devices in the circuit design, the functioning of the auxiliary simulation devices can be mimicked by the circuit simulation module (162$m$). For this purpose, the circuit simulation module (162$m$) buffers data transmitted via the parallel data transfer paths (L0)-(L7), analyzes the buffered data and inserts, erases or replaces symbols in the buffered data before remitting them to the receiver (22). Furthermore, the sender (21) and the receiver (22) can be real (physical) devices, wherein a test device (not shown) buffers data transmitted via the parallel data transfer paths (L0) to (L7), analyzes the buffered data and inserts, erases or replaces symbols in the buffered data before remitting them to the receiver (22). The test device may implement the design and functionality of the auxiliary simulation devices (400), (410) . . . and (470).

In yet another preferred embodiment, the control data packet is erased or replaced by data, or the further control data packet is inserted by manipulating data. Preferably, the data is outputted by a real (physical) digital circuit and not a digital circuit design during a simulation.

In yet another preferred embodiment, a further skew is introduced between the sequences by erasing or replacing yet another one of the control data packets or by inserting yet another control data packet in one of the sequences. The skews introduced by the insertion of the control data packet and the skews introduced by the erasure or replacement of the control data packet might add up or cancel each other. The step(s) implementing this preferred embodiment can be repeated several times.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
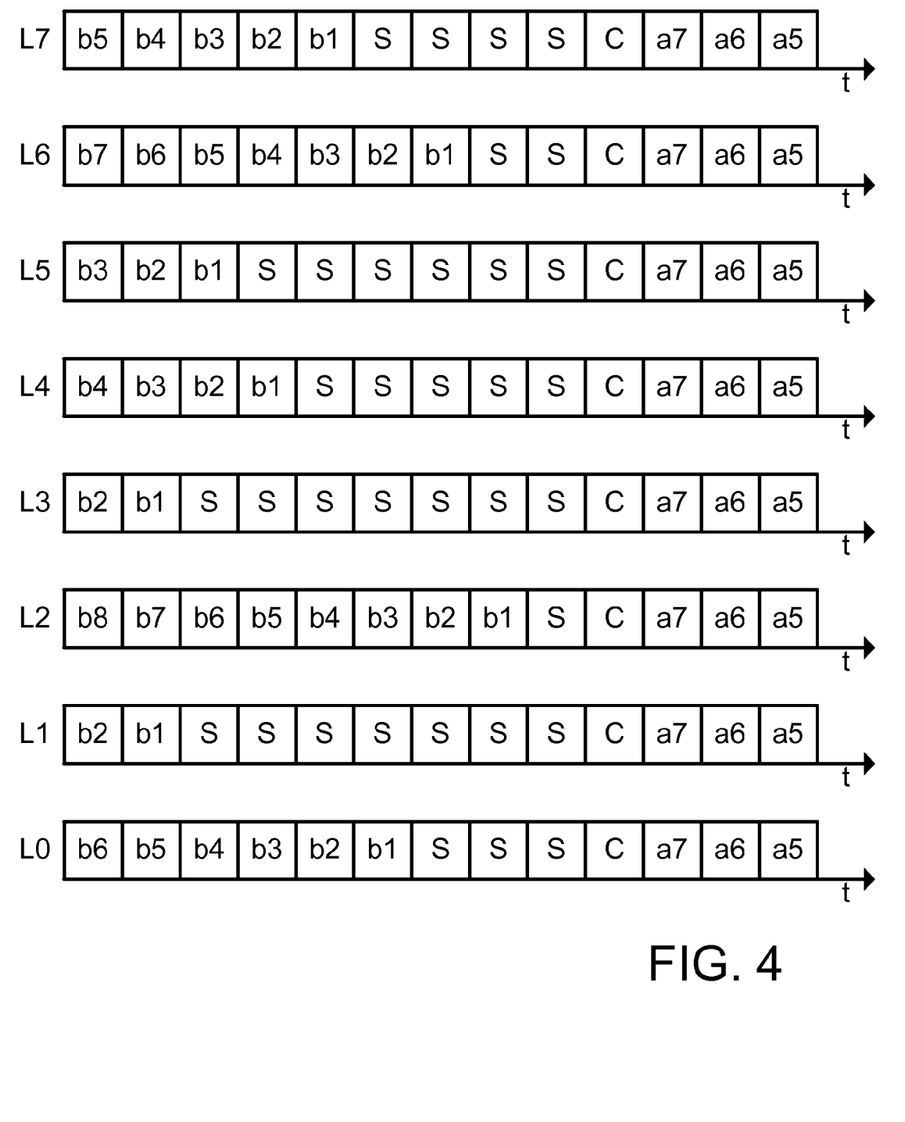
FIG. 4 shows parallel input data sequences of the receiver.

FIG. 4 shows parallel input data sequences of the receiver received from the lanes (L0) to (L7). Each input data sequence comprises several control symbols forming a SKIP ordered set including a COM symbol C and one or several SKIP symbols and several data symbols (a5) . . . (a7), (b1) . . . (b8) representing the other transmitted data including payload data. Data symbols having identical reference numerals must not be identical, but should be forwarded by the deskew circuit of the receiver roughly at the same time as these data symbols must be processed together. All symbols comprise several bits. SKIP symbols can be inserted or erased by the auxiliary simulation devices (see FIG. 3) in the data sequences received from the sender. SKIP ordered sets comprising a fixed number of SKIP symbols are used in PCIe networks for clock compensation and deskewing. The COM symbol and the SKIP symbol are defined in a PCIe standard and used in order to achieve control over the other transmitted data.

Figure 5:
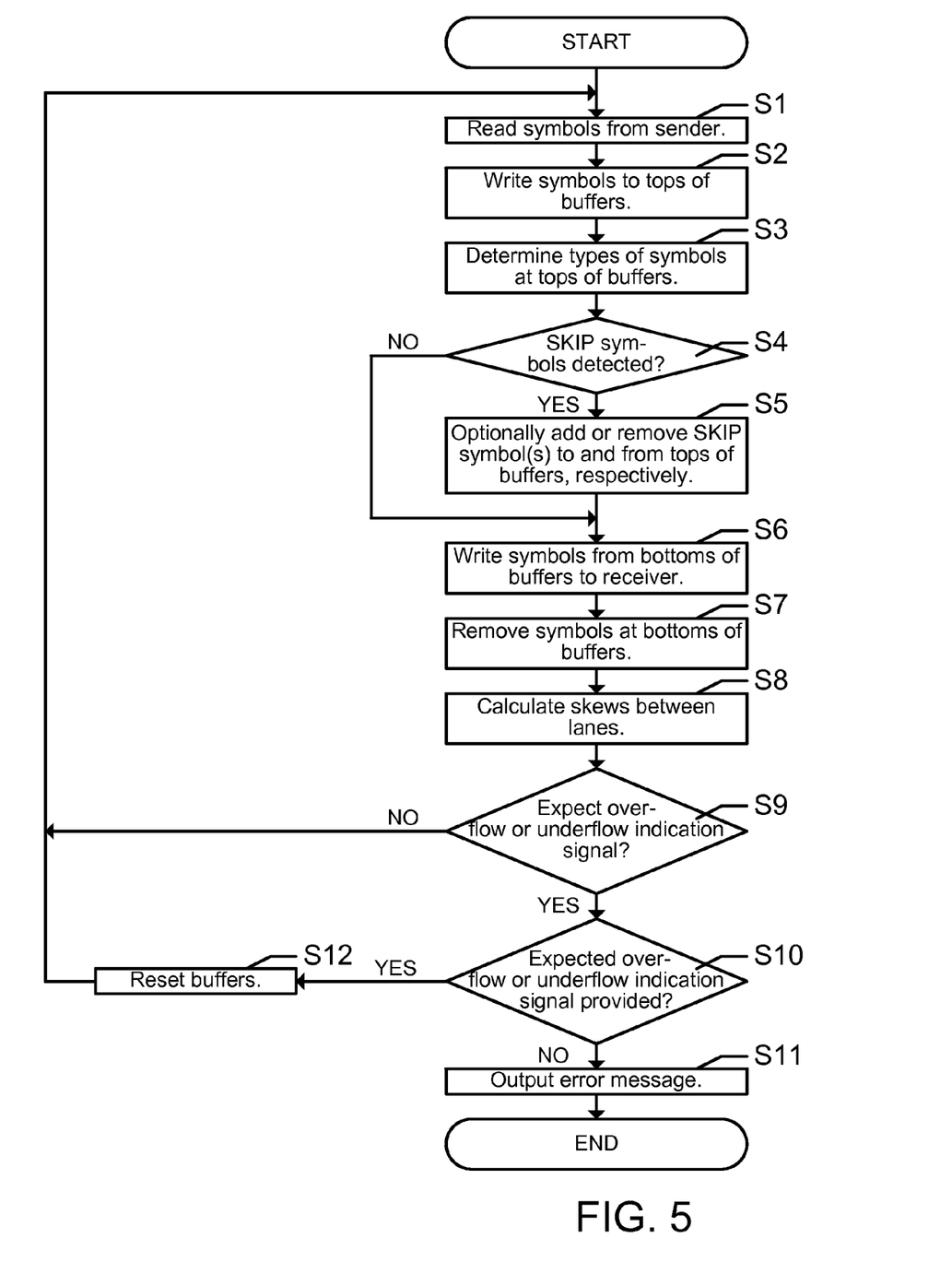
FIG. 5 shows a flowchart of a method for verifying the functionality of a digital circuit.

FIG. 5 shows a flowchart of a method for verifying the functionality of a digital circuit based on the circuit model shown in FIG. 3. The reference numerals given hereinafter refer to FIG. 3. This method can be performed analogously without auxiliary simulation devices just by the manipulation of simulation data as explained before. Furthermore, this method can also be performed analogously for real (physical) devices (e.g., in order to check their functionality after production). Each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In step (S1), output symbols (O0), (O1), (O2), (O3), (O4), (O5), (O6), and (O7) of the sender (21) received from the lanes (L0), (L1), (L2), (L3), (L4), (L5), (L6), and (L7) are read by the respective auxiliary simulation devices (400), (410) . . . and (470).

In step (S2), the output symbols (O0), (O1) . . . and (O7) received from the lanes (L0), (L1) . . . (L7) are written to the tops of the buffers (401), (411) . . . and (471) of the respective auxiliary simulation devices (400), (410) . . . and (470).

In step (S3), the types of the symbols (O0), (O1), (O2), (O3), (O4), (O5), (O6), and (O7) at the tops of the buffers are determined by the symbol analyzers (402), (412) . . . and (472) of the respective auxiliary simulation devices (400), (410) . . . and (470).

In step (S4), each of the controllers (403), (413) . . . and (473) checks whether the symbol stored at the top of the respective buffer (401), (411) . . . or (471) is SKIP symbol or not. In practice, SKIP symbols should be detected simultaneously at the tops of all buffers (401), (411) . . . and (471) as the deskew circuit of the sender inserts a SKIP ordered set comprising one COM symbol and a fixed number of SKIP symbols (usually three) for all lanes (L0),(L1) . . . and (L7) simultaneously.

If SKIP symbols are stored at the tops of the buffers (401), (411) . . . and (471), the procedure continues with step (S5). In step (S5), each controller (403), (413) . . . (473) optionally causes the respective symbol generator (404), (414) . . . or (474) to generate one or several SKIP symbols depending on the control signals received from the respective control signal lines (Cl0), (CL1) . . . or (CL7). The generated SKIP symbol(s) is (are) written to the tops of the respective buffers (401), (411) . . . and (471). Alternatively, SKIP symbol(s) could optionally be removed from the top(s) of one or several buffer(s) depending on the control signals received from the respective control signal lines (Cl0), (CL1) . . . or (CL7). The generation or removal can be basically random or according to a fixed scheme.

If SKIP symbols are not stored at the tops of buffers (401), (411) . . . and (471), the procedure continues with step (S6). In step (S6), the symbols stored at the bottoms of the buffers (401), (411) . . . and (471) are written to the receiver (22).

In step (S7), the symbols are removed at the bottoms of the buffers (401), (411) . . . and (471).

In a preferred embodiment, the skew between the sequences is determined. Preferably, the skew between all sequences is determined. In step (S8), the skews between all lanes (L0), (L1), (L2), (L3), (L4), (L5), (L6), and (L7) are calculated and the maximum skew between all lanes (L0), (L1), (L2), (L3), (L4), (L5), (L6), and (L7) is determined. The receiver is designed to support a specific maximum skew. The result of this determination is used in order to predict the expected behavior of the sender. In yet another preferred embodiment, the further control data packet is inserted in one of the sequences, and one of the control data packets is erased in another of the sequences. This can result in a maximum skew which corresponds to the combined lengths of the control data sequence and the further control data sequence.

In step (S9), it is determined whether an overflow or underflow indication signal is expected. The overflow or underflow indication signal is expected if the maximum skew exceeds a permissible maximum skew. In this context, overflow is a situation that occurs in the receiver when data is being transmitted to the receiver at a higher speed than the receiver can handle or when more data is being transmitted to the receiver than the receiver can process. In this context, underflow is a situation that occurs in the receiver when data is being transmitted to the receiver at a lower speed than the receiver can handle or when less data is being transmitted to the receiver than the receiver requires. In this, context, the overflow or underflow indication signal is a signal which indicates that there is the overflow or the underflow or the receiver. The indication signals might be displayed as messages on a monitor.

If no overflow or underflow indication signal is expected, the procedure continues with step (S1). The procedure starts for the next set of parallel symbols received from the sender (21) without resetting the buffer(s) (401), (411) . . . and (471).

If the overflow or underflow indication signal is expected, the procedure continues with step (S10).

In step (S10), it is checked whether the expected overflow or underflow indication signal is provided. The expected overflow or underflow indication signal is provided if the maximum skew between two of the lanes is exceeded and the provided overflow or underflow indication signal indicates that the maximum skew is exceeded. Preferably, an indication signal is as well outputted in case that the expected overflow or underflow indication signal is provided.

If the expected overflow or underflow indication signal is not provided, the procedure continues with step (S11). In step (S11), an error message is outputted indicating that the expected overflow or underflow indication signal is not provided.

If the expected overflow or underflow indication signal is provided, the procedure continues with step (S12). In step (S12), all buffers are reset. The procedure is repeated for the next set of parallel symbols received from the sender (21). In case that the maximum skew is exceeded in step (S9), the symbols determined in step (S5) can be chosen in a manner to ensure that the maximum skew between the lanes determined in step (S7) is reduced.

In FIG. 6A to 6H, the manipulation of subsequent output sequences by the auxiliary simulation devices or alternatively by the circuit simulation module or the test device is shown for lane (L0) and lane (L1).

Figure 6A:
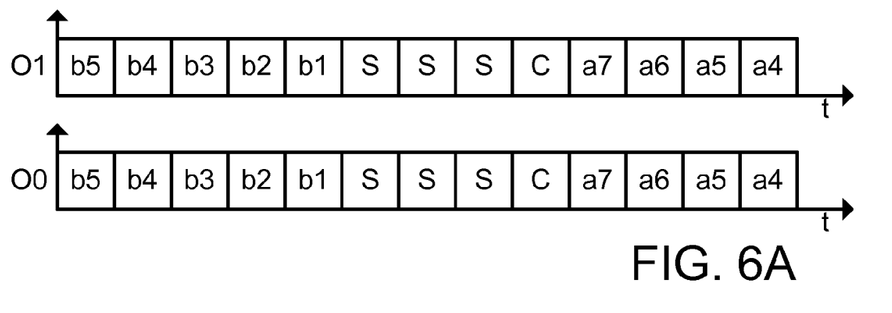
FIG. 6A shows two first sequences of output signals of the sender.

FIG. 6A shows two first sequences of output signals (O0) of the sender. The upper sequence of output signals (O1) is at the port of lane (L1) as indicated by the label (O1). The lower sequence of output signals (O0) is at the port of lane (L0) as indicated by the label (O0). In FIG. 6C, FIG. 6E, and FIG. 6G, the upper sequence of output signals (O1) is as well at the port of lane (L1) as indicated by the label (O1). In FIG. 6C, FIG. 6E, and FIG. 6G, the lower sequence of output signals (O0) is as well at the port of lane (L0) as indicated by the label (O0). The output signals on lane (L1) and (L0) each comprise a SKIP ordered set including a COM symbol (C), and one or several SKIP symbols (S). Identical reference numerals (a4) . . . (a7), (b1) . . . (b5) identify parallel symbols on lane (L0) and (L1) which belong together and must be processed together, wherein symbols transferred on lanes (L0) and (L1) and having identical reference numerals must not be identical.

Figure 6B:
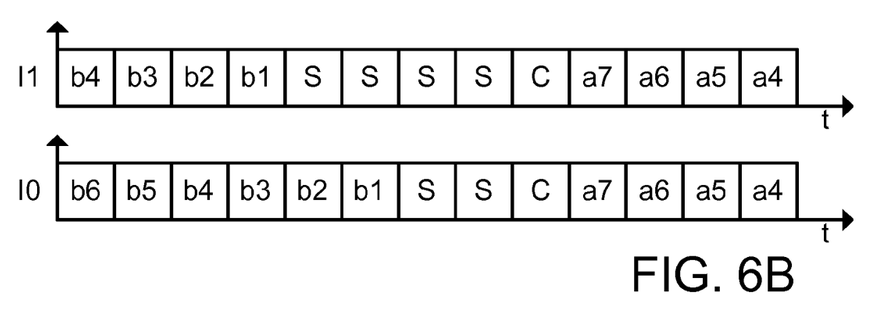
FIG. 6B shows two first sequences of input signals of the receiver.
Figure 6C:
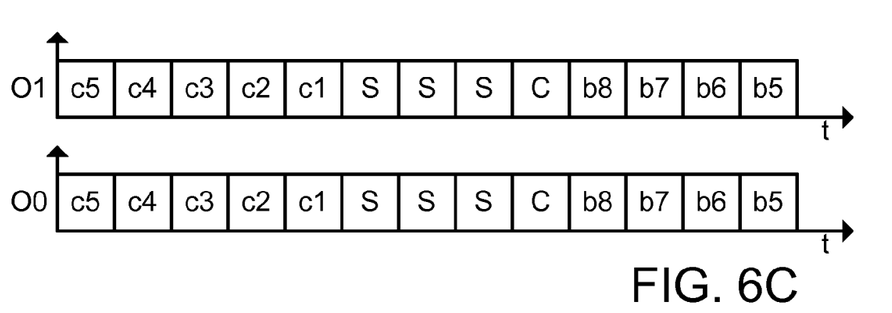
FIG. 6C shows two second sequences of output signals of the sender.
Figure 6D:
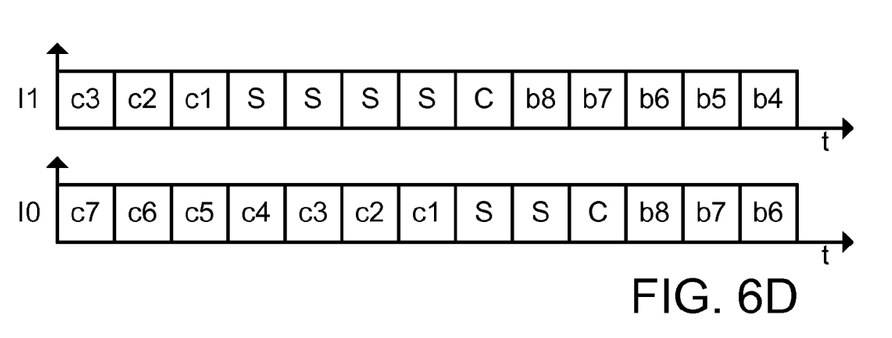
FIG. 6D shows two second sequences of input signals of the receiver.
Figure 6E:
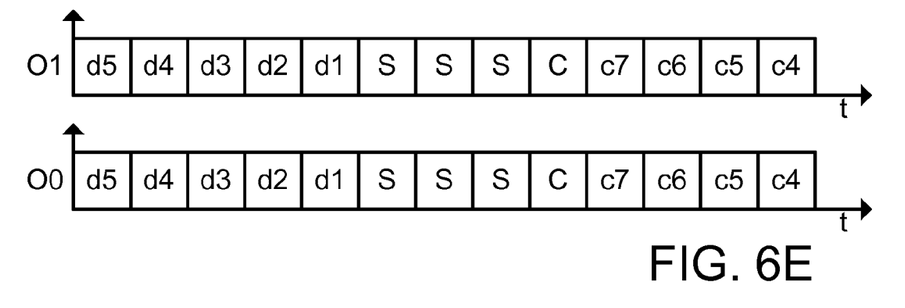
FIG. 6E shows two third sequences of output signals of the sender.
Figure 6F:
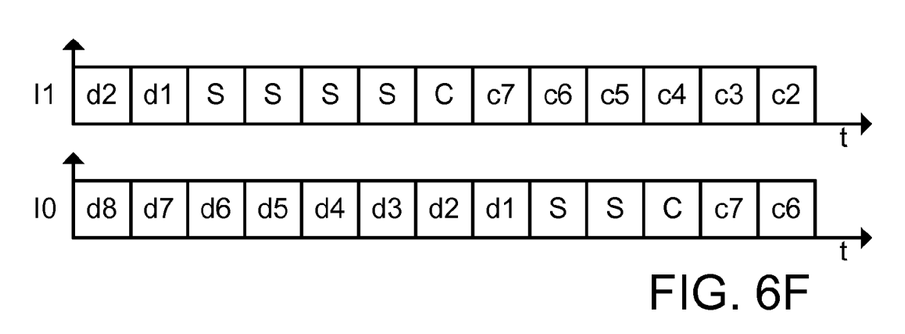
FIG. 6F shows two third sequences of input signals of the receiver.
Figure 6G:
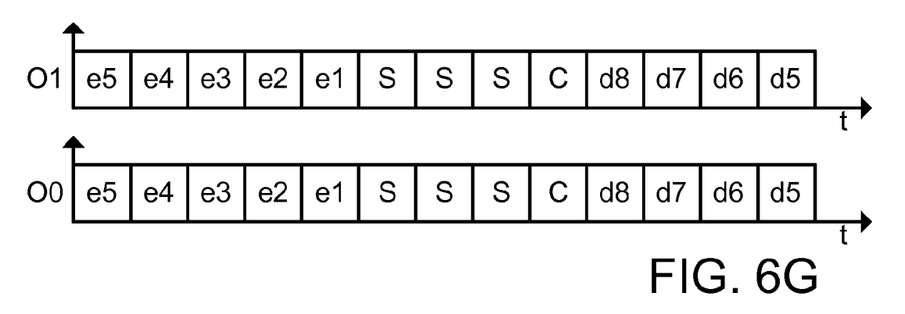
FIG. 6G shows two fourth sequences of output signals of the sender.
Figure 6H:
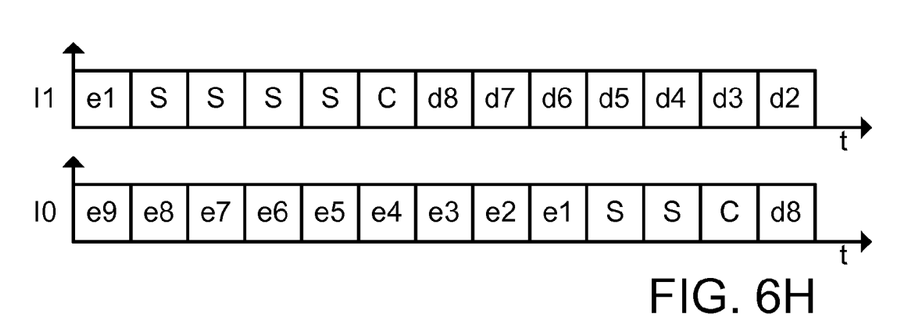
FIG. 6H shows two fourth sequences of input signals of the receiver.

FIG. 6B shows two first sequences of input signals at the receiver. The upper sequence of input signals (I1) is at the port of lane (L1) as indicated by the label (I1). The lower sequence of input signals (I0) is at the port of lane (L0) as indicated by the label (I0). In FIG. 6D, FIG. 6F, and FIG. 6H, the upper sequence of input signals I1 is as well at the port of lane (L1) as indicated by the label (I1). The first two sequences of input values are determined in step (S8) and outputted in step (S12) (see FIG. 5). In FIG. 6D, FIG. 6F, and FIG. 6H, the lower sequence of input signals (I0) is as well at the port of lane (L0) as indicated by the label (I0). These sequences of input values are as well determined in step (S5) and outputted in step (S6) (see FIG. 5). The input signals on lane (L1) and (L0) each comprise a SKIP ordered set including a COM symbol C, and one or several SKIP symbols S. Identical reference numerals (a4) . . . (a7), (b1) . . . (b5) identify parallel data on lane (L0) and (L1) which belong together and must be processed together, wherein data transferred on lanes (L0) and (L1) and having identical reference numerals must not be identical. On lane (L1), the input signals differ from the output signal in that a SKIP symbol is added. On lane (L0), the input signals differ from the output signals in that a SKIP symbol is erased. The skew between both lanes corresponds to two SKIP symbols.

FIG. 6C shows two second sequences of output signals of the sender. These two second sequences follow the two first sequences. FIG. 6D shows two second sequences of input signals of the receiver. On lane (L1), the input signals differ from the output signal in that a SKIP symbol is added. On lane (L0), the input signals differ from the output signals in that a SKIP symbol is erased. As the second sequences follows the first sequences, the skews introduced by the insertion of one SKIP symbol on lane (L1) and the erasure of one SKIP symbol for the first sequences and the second sequences add up. The skew between both lanes corresponds to four SKIP symbols.

FIG. 6E shows two third sequences of output signals of the sender. These two third sequences follow the two second sequences. FIG. 6F shows two third sequences of input signals of the receiver. On lane (L1), the input signals differ from the output signal in that a SKIP symbol is added. On lane (L0), the input signals differ from the output signals in that a SKIP symbol is erased. As the third sequences follows the second sequences, the skews introduced by the insertion of one SKIP symbol on lane (L1) and the erasure of one SKIP symbol for the first sequences, the second sequences, and the third sequences add up. The skew between both lanes corresponds to six SKIP symbols.

FIG. 6G shows two fourth sequences of output signals of the sender. These two fourth sequences follow the two third sequences. FIG. 6H shows two fourth sequences of input signals of the receiver. On lane (L1), the input signals differ from the output signal in that a SKIP symbol is added. On lane (L0), the input signals differ from the output signals in that a SKIP symbol is erased. As the fourth sequences follows the third sequences, the skews introduced by the insertion of one SKIP symbol on lane (L1) and the erasure of one SKIP symbol for the first sequences, the second sequences, the third sequences, and the fourth sequences add up. The skew between both lanes corresponds to eight SKIP symbols. This skew exceeds the permissible maximum skew for the specified circuit design.

As will be appreciated by one skilled in the art, the aspects described above may be embodied as a system, method or computer program product. Accordingly, the aspects described above may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the aspects described above may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the aspects described above may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The aspects are described above with reference to flowchart illustrations and/or block diagrams of methods, systems, and computer program products according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to the various embodiments described above. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The foregoing description has been presented for purposes of illustration and description, but is not intended to be exhaustive or limited in the form disclosed. Many modifications and variations will be apparent to those of ordinary skill in the art without departing from the scope and spirit of the embodiments. The embodiment was chosen and described in order to best explain the principles of the invention and the practical application, and to enable others of ordinary skill in the art to understand the invention for various embodiments with various modifications as are suited to the particular use contemplated. Accordingly, the introduction of a skew between parallel data packets transferred between a sender and receiver in order to determine whether an overflow or underflow signal is expected provides efficiency to verify the functionality of a digital circuit.

ALTERNATIVE EMBODIMENT

It will be appreciated that, although specific embodiments have been described herein for purposes of illustration, various modifications may be made without departing from the spirit and scope of the embodiments. Accordingly, the scope of protection is limited only by the following claims and their equivalents.

What is claimed is:
1. A method comprising:
transmitting sequences of parallel data packets via the parallel data paths;
prior to receipt of at least two of the transmitted sequences, introducing a first skew between the at least two of the transmitted sequences, wherein the introduction includes inserting one or more parallel control data packets in the transmitted sequences, and selecting an action from the group consisting of: erasing one of the control data packets, replacing one of the control data packets, and inserting another control data packet in one of the transmitted sequences;
calculating skews between all the paths;
determining a maximum skew of the calculated skews;
comparing the maximum skew to a permissible maximum skew of a circuit;
determining when an expected indication signal is provided, wherein the expected indication signal is selected from the group consisting of: an overflow indication and an underflow indication, and wherein the indication signal is expected when the maximum skew exceeds the permissible maximum skew; and resetting buffers in response to receipt of the expected indication signal.

2. The method of claim 1, wherein introducing the skew by inserting another control data packet in one of the transmitted sequences comprises erasing a control data packet in another one of the transmitted sequences.

3. The method of claim 1, further comprising introducing a second skew between the at least two of the transmitted sequences, wherein the introduction includes inserting one or more parallel control data packets in the transmitted sequences, and selecting an action from the group consisting of: erasing one of the control data packets, replacing one of the control data packets, and inserting another control data packet in one of the transmitted sequences.

4. The method of claim 1, wherein each control data packet comprises a control symbol.

5. The method of claim 4, wherein the control symbol is a SKIP symbol, and wherein the control data packets comprise a SKIP ordered set including a COM symbol and at least one SKIP symbol.

6. The method of claim 1, further comprising buffering the transmitted packets and analyzing the buffered packets prior to introducing the first skew, wherein the first skew is introduced based in part on the analysis.

7. The method of claim 6, wherein introducing the first skew further includes selecting an action from the group consisting of: generating parallel data packets, outputting the buffered packets to a receiver, and a combination thereof.

8. The method of claim 1, further comprising, upon the expected indication signal not being provided, outputting an error message.

9. A system comprising:
a processor coupled to memory;
a sender to transmit sequences of parallel data packets via data paths;
one or more devices to, prior to receipt of at least two of the transmitted sequences, introduce a first skew between the at least two of the transmitted sequences, wherein the introduction includes inserting one or more parallel control data packets in the transmitted sequences, and selecting an action from the group consisting of: erasing one of the inserted control packets, replacing one of the control packets, and inserting another control packet in one of the sequences; and
a receiver to calculate skews between all the paths, determine a maximum skew of the calculated skews, compare the maximum skew to a permissible maximum skew of a circuit, receive the transmitted packets, and to determine when an expected indication signal is provided, wherein the expected indication signal is selected from the group consisting of: an overflow indication and an underflow indication, and wherein the indication signal is expected when the maximum skew exceeds the permissible maximum skew; and
the receiver to reset buffers in response to a determination that the expected signal is provided.

10. The system of claim 9, further comprising introducing a second skew between the at least two of the transmitted sequences, wherein the introduction includes inserting one or more parallel control data packets in the transmitted sequences, and selecting an action from the group consisting of: erasing one of the control data packets, replacing one of the control data packets, and inserting another control data packet in one of the transmitted sequences.

11. The system of claim 9, wherein each of the control data packets comprises a control symbol.

12. The system of claim 11, wherein the control symbol is a SKIP symbol, and wherein the control data packets comprise a SKIP ordered set including a COM symbol and at least one SKIP symbol.

13. The system of claim 9, wherein the sender comprises a first component for inserting the one or more control packets and the receiver comprises a second component for removing the at least one inserted control packet.

14. The system of claim 9, further comprising the one or more devices to buffer the transmitted packets and to analyze the buffered packets prior to introducing the first skew, wherein the at least one device introduces the first skew based in part on the analysis.

15. The system of claim 14, wherein the one or more devices comprise an auxiliary simulation device controlled by a control signal, and wherein introducing the skew includes, based on the analysis and the control signal, selecting an action from the group consisting of: generate parallel data packets, output the buffered packets, and a combination thereof, and wherein each path includes an auxiliary simulation device.

16. The system of claim 14, wherein the one or more devices comprise a circuit simulation module.

17. A computer program product comprising a computer hardware storage device having computer readable program code embodied thereon, which when executed causes a computer to implement a method comprising:
transmitting sequences of parallel data packets via the parallel data paths;
prior to receipt of at least two of the transmitted sequences, introducing a first skew between the at least two of the transmitted sequences, wherein the introduction includes inserting one or more parallel control data packets in the transmitted sequences, and selecting an action from the group consisting of: erasing one of the control data packets, replacing one of the control data packets, and inserting another control data packet in one of the transmitted sequences;
calculating skews between all the paths;
determining a maximum skew of the calculated skews;
comparing the maximum skew to a permissible maximum skew of a circuit;
determining when an expected indication signal is provided, wherein the indication signal is selected from the group consisting of: an overflow indication and an underflow indication, wherein the indication signal is expected when the maximum skew exceeds the permissible maximum skew; and
resetting buffers in response to receipt of the expected indication signal.

* * * * *